(12) United States Patent
Chen et al.

(10) Patent No.: US 10,319,989 B2
(45) Date of Patent: Jun. 11, 2019

(54) SYSTEMS AND METHODS OF PREPARING LITHIUM SULFUR ELECTRODE USING SACRIFICIAL TEMPLATE

(71) Applicant: Massachusetts Institute of Technology, Cambridge, MA (US)

(72) Inventors: Xinwei Chen, Cambridge, MA (US); Jiayan Luo, Cambridge, MA (US); Yet-Ming Chiang, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/905,017

(22) Filed: Feb. 26, 2018

(65) Prior Publication Data

US 2018/0190973 A1    Jul. 5, 2018

Related U.S. Application Data

(63) Continuation of application No. PCT/US2016/053770, filed on Sep. 26, 2016.
(Continued)

(51) Int. Cl.
*H01M 4/1397* (2010.01)
*H01M 4/136* (2010.01)
(Continued)

(52) U.S. Cl.
CPC ....... *H01M 4/1397* (2013.01); *H01M 4/0483* (2013.01); *H01M 4/136* (2013.01);
(Continued)

(58) Field of Classification Search
CPC ....... H01M 10/052; H01M 2300/0028; H01M 2300/0065; H01M 2300/0068;
(Continued)

(56) References Cited

U.S. PATENT DOCUMENTS 5,789,108 A * 8/1998 Chu ..................... C07C 227/32
                                                        136/238
6,547,838 B1    4/2003 Lee et al.
(Continued)

OTHER PUBLICATIONS

International Search Report and Written Opinion dated Dec. 27, 2016 for International Application No. PCT/US16/53770, 8 pages.
(Continued)

*Primary Examiner* — Carlos Barcena
(74) *Attorney, Agent, or Firm* — Gesmer Updegrove LLP

(57) ABSTRACT

Embodiments described herein relate generally to lithium sulfur batteries and methods of producing the same. As described herein, preventing coarsening of sulfur during the well-known melt-diffusion processing of cathodes allows a high areal capacity of 10.7 mAh/cm$^2$ at current density of 3.4 mA/cm$^2$ (C-rate of 1/5 h$^{-1}$). The addition of a lithium salt, such as LiTFSI, prior to melt-diffusion can prevent coarsening of molten sulfur and allows creation of a sulfur electrode with a high concentration of triple-phase junctions for electrochemical reaction. In some embodiments, approximately 60-70% utilization of the theoretical capacity of sulfur is reached at a high loading (e.g., greater than 7.5 mg S/cm$^2$). The electrodes are prepared in lean-electrolyte environment of 3 ml$_{electrolyte}$/g$_{sulfur}$ (~70 vol % of electrolyte in the electrode) for high areal capacity in Li—S batteries.

20 Claims, 14 Drawing Sheets

High concentration of triple phase junction of sulfur, carbon and electrolyte

Current approach prevents sulfur coarsening at T > T$_m$ of sulfur

Related U.S. Application Data

(60) Provisional application No. 62/241,831, filed on Oct. 15, 2015, provisional application No. 62/232,160, filed on Sep. 24, 2015.

(51) Int. Cl.
*H01M 4/04* (2006.01)
*H01M 4/38* (2006.01)
*H01M 4/62* (2006.01)
*H01M 10/052* (2010.01)

(52) U.S. Cl.
CPC ............ *H01M 4/38* (2013.01); *H01M 4/625* (2013.01); *H01M 10/052* (2013.01); *H01M 2300/0028* (2013.01); *H01M 2300/0065* (2013.01); *H01M 2300/0068* (2013.01)

(58) Field of Classification Search
CPC .. H01M 4/0483; H01M 4/136; H01M 4/1397; H01M 4/38; H01M 4/625
See application file for complete search history.

(56) References Cited

U.S. PATENT DOCUMENTS

| | | | |
|---|---|---|---|
| 2002/0192557 A1* | 12/2002 | Choi | H01M 4/0416 429/232 |
| 2012/0088154 A1 | 4/2012 | Liu et al. | |
| 2013/0183547 A1 | 7/2013 | Kourtakis | |
| 2013/0302684 A1 | 11/2013 | Koshika et al. | |
| 2014/0342234 A1* | 11/2014 | Guo | H01M 10/052 429/231.4 |
| 2015/0221935 A1 | 8/2015 | Zhou et al. | |

OTHER PUBLICATIONS

Raj, K. J. A. et al., "Effect of surface area, pore Volume and particle size of P25 titania on the phase transformation of anatase to rutile," *Indian Journal of Chemistry*, 48A, pp. 1378-1382 (Oct. 2009).

\* cited by examiner

SYSTEMS AND METHODS OF PREPARING LITHIUM SULFUR ELECTRODE USING SACRIFICIAL TEMPLATE

CROSS-REFERENCE TO RELATED APPLICATIONS

This application is a continuation application of International Application No. PCT/US2016/053770, entitled "Systems And Methods Of Preparing Lithium Sulfur Electrode Using Sacrificial Template," and filed Sep. 26, 2016, which claims priority to and the benefit of U.S. Provisional Application No. 62/232,160, entitled "Grafting Ionic Moiety to Sulfur for Lithium-Sulfur Battery," filed Sep. 24, 2015, and U.S. Provisional Application No. 62/241,831 entitled "Grafting Ionic Moiety to Sulfur for Lithium-Sulfur Battery," filed Oct. 15, 2015, the disclosures of which are incorporated herein by reference in their entirety.

This invention was made with Government Support under Grant No. DE-AC02-06CH11357 awarded by the Department of Energy. The government has certain rights in the invention.

BACKGROUND

Lithium-sulfur (Li—S) batteries have the potential to deliver exceptional energy density with its high theoretical specific capacity of sulfur (1675 mAh/g) and the energy density of Li—S chemistry (2500 Wh/kg), while maintaining its cost-competitiveness due to the abundancy of sulfur and its non-toxicity. Despite its promised high theoretical capacity, practical application of sulfur-based batteries remains a challenge due to their low utilization and capacity fading. The present invention provides electrodes with higher sulfur loadings and areal capacities compared to those previously known in the art, which are prepared by simple methods as described herein.

SUMMARY

Embodiments described herein relate generally to systems and methods of preparing Li—S electrodes using sacrificial templates. In some embodiments, the Li—S electrodes include sulfur, conductive carbon, and one or more lithium salts to form a dry mixture. In some embodiments, the dry mixture is heated above the melting point of sulfur, but below the melting point of the sacrificial template to facilitate distribution of sulfur or melt-diffusion (as used in the art, the term "melt-diffusion" refers the melting of sulfur followed by its redistribution or partial redistribution due to wetting or infiltration) to create a high concentration of triple-phase junctions. In some embodiments, a method for preparing a sulfur electrode comprises combining sulfur powder, at least one lithium salt, such as LiTFSI ((Lithium bis (trifluoromethanesulfonyl) imide), and an electrically conductive solid, such as conductive carbon, to produce a mixture, heating the mixture at a temperature sufficient to melt the sulfur powder but not the lithium salt, thereby causing at least a portion of the sulfur to wet the conductive solid to form a composite, cooling the composite to solidify the sulfur, and extracting the lithium salt from the composite with a solvent to form an electrochemical cell.

In some embodiments, a material used as a battery electrode can comprise a solid-state sacrificial template and sulfur, which when heated undergoes reduced coarsening of the sulfur, thereby increasing the electrochemical activity of the electrode. Unlike previous methods of producing finely divided or high surface area sulfur such as infiltration of molten sulfur into nanoporous or mesoporous carbons, the present invention increases the electrochemical activity of sulfur by providing a higher surface area template for sulfur to conform to, instead of the coarsening of the sulfur into large particles of lower specific surface area provided by prior art methods. In some embodiments, the solid state sacrificial template has a melting or decomposition temperature higher than that of sulfur. When heated to above the melting point of sulfur, but below the melting point of the solid-state template during the processing of the electrode, the solid-state template remains in the solid form when the sulfur is molten.

In some embodiments, the electrode, e.g. a battery electrode, can include sulfur particulates or powders. In some embodiments, the powders/particulates can be about 5 nm to about 500 µm. In some embodiments, the powders/particulates can be about 50 nm to about 500 µm. In some embodiments, the powders/particulates can be about 500 nm to about 500 µm. In some embodiments, the powders/particulates can be about 5 µm to about 500 µm. In some embodiments, the powders/particulates can be about 50 µm to about 500 µm. In some embodiments, the powders/particulates can be about 50 nm to about 50 µm. In some embodiments, the powders/particulates can be about 50 nm to about 5 µm. In some embodiments, the powders/particulates can be about 50 nm to about 500 nm. In some embodiments, the powders/particulates can be about 5 nm to about 50 nm. In some embodiments, the powders/particulates can have an average size of about 5 nm, 10 nm, 15 nm, 20 nm, 25 nm, 30 nm, 40 nm, 50 nm, 60 nm, 70 nm, 80 nm, 90 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1 µm, 1.1 µm, 1.2 µm, 1.3 µm, 1.4 µm, 1.5 µm, 1.6 µm, 1.7 µm, 1.8 µm, 1.9 µm, 2 µm, 2.5 µm, 3 µm, 3.5 µm, 4 µm, 4.5 µm, v, 5 µm, 6 µm, 7 µm, 8 µm, 9 µm, 10 µm, 12 µm, 14 µm, 16 µm, 18 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm, 150 µm, 200 µm, 250 µm, 300 µm, 350 µm, 400 µm, 450 µm, or 500 µm, inclusive of all sizes and ranges therebetween. In some embodiments, the powders/particulates have a narrow particle size distribution. In some embodiments, the powders/particulates have a wide particle size distribution.

In some embodiments, the solid state sacrificial template is soluble in the electrolyte of the battery. This allows the sacrificial template to be partially or completely removed by dissolving into the electrolyte. In some embodiments, the electrolyte is an inorganic solid, a polymer, or a liquid. The solvent of the electrolyte phase may be solid or liquid. Examples include oxide or sulfide solid electrolytes, solid polymer electrolytes such as those based on polyethylene oxide in neat or copolymer or block copolymer form, and liquid electrolytes including but not limited to nonaqueous electrolytes such as those comprising carbonates, glymes, ethers, DOL-DME, ketones, ionic liquids, and the like, or aqueous electrolytes. In some embodiments, the electrolyte phase comprises a redox mediator. A redox mediator in the electrolyte phase increases the rate of electronic charge transfer and increases the electrochemical reactivity of the sulfur. In some embodiments, the sacrificial template when dissolved in the electrolyte increases the working ion conductivity of the electrolyte. The sacrificial template material, upon dissolution into the electrolyte, may serve to beneficially increase the ion conductivity of the electrolyte phase.

In some embodiments, the sacrificial template comprises any salt that can dissolve in a solvent. In some embodiments, the sacrificial template comprises a metal salt. Metal salts are commonly dissolved in solvents to provide cationic or anionic conductivity. In some embodiments, the sacrificial template comprises one or more alkali metal salts. In some embodiments, the sacrificial template comprises a lithium salt, including but not limited to LiTFSI and LiFSI. In some embodiments, the lithium salts used to impart lithium ion conductivity to liquid or polymeric electrolytes are LiTFSI and LiFSI. In some embodiments, the lithium salts also have a melting/decomposition temperature higher than that of sulfur. In some embodiments, the sacrificial template comprises a sodium salt.

In some embodiments, the electrodes of the present invention include an electronically conductive solid. In some embodiments, the electrically conductive solid comprises carbon, graphite, fullerenes, carbon nanotubes, graphene, graphene oxide or the like. In some embodiments, an electronic conductor in contact with the sulfur (as described herein) increases the charge transfer rate and electrochemical reactivity of the electrode. In some embodiments, the electronically conductive solid forms a continuous percolating network within said electrode. In some embodiments, the electronically conductive solid forms a chemical bond with sulfur as described herein. In some embodiments, the bonding between the sulfur and the electronic conductor produces triple-phase junctions where the conductor, the sulfur, and the electrolyte meet. In some embodiments, the electrochemical reactivity is increased at such triple-phase junctions (also referred to as triple junctions). In some embodiments, the sacrificial template is used in the form of a particulate material. In some embodiments, the sacrificial template material restricts spreading of sulfur on the surface of said conductive solid. In some embodiments, the sacrificial template material preferentially segregates to the interface or intersection of the sulfur and said conductive solid, and thereby limits coarsening of the sulfur or spreading of the sulfur on the conductive solid. In some embodiments, the sacrificial template material is wetted or partially wetted by the sulfur, causing the sulfur to adopt the morphology, topology, or surface structure of the sacrificial template. In some embodiments, the sacrificial template has a specific surface area between 0.1 and 1000 $m^2/g$, more particularly between 0.2 and 500 $m^2/g$, and more particularly still between 0.3 and 100 $m^2/g$. In some embodiments, the sacrificial template after removal produces sulfur with a specific surface area between 0.1 and 1000 $m^2/g$, more particularly between 0.2 and 500 $m^2/g$, and more particularly still between 0.3 and 100 $m^2/g$.

In some embodiments, the sacrificial template material combined with sulfur and the conductive solid produces a composite electrode which when infiltrated by said electrolyte has a higher total length of sulfur-electrolyte-conductive solid junctions, namely triple-phase junctions, than otherwise identical composite electrode prepared in the absence of the sacrificial template. In some embodiments, the sacrificial template is has a morphology, topology, or surface structure controlled by the prior processing of the sacrificial template, including but not limited to: classification of particulates of the sacrificial template by particle size or particle size distribution, and selection of a preferred particle size or particle size distribution; sintering of particulates of the sacrificial template material; controlling the particle and/or pore geometry of the sacrificial template material; fabricating the sacrificial template material in the form of anisometric particles or consolidating said material with anisometric pores; fabricating said sacrificial template material or resulting sulfur-comprising electrode so as to have aligned or low-tortuosity porosity, including having alignment or low tortuosity porosity in the primary direction of ion transport in the battery electrode, e.g., normal to the plane of a planar electrode or the separator of the electrochemical cell; forming said sacrificial template material as anisometric particles through precipitation processes; and forming aligned microstructures or aligned porosity or low tortuosity porosity using directional extrusion or solidification methods, as described in U.S. Pat. No. 9,065,093, entitled "Controlled Porosity in Electrodes," issued Jun. 23, 2015, or magnetic alignment processes, as described in U.S. patent application Ser. No. 62/059,315, filed Oct. 3, 2014, or U.S. patent application Ser. No. 62/217,554, filed Sep. 11, 2015, and U.S. Patent Publication 2016/096334, entitled "Pore Orientation using Magnetic Fields," published Apr. 7, 2016, each of which is enclosed in its entirety by reference.

In some embodiments, the sacrificial template has a morphology, topology, or surface structure with periodic or quasi-periodic features prepared by any of the above methods. In some embodiments, a preparation process includes, heating the battery electrodes to a temperature above the melting point of sulfur and below the melting or decomposition temperature of the sacrificial template material, and subsequently dissolving said sacrificial template material with a solvent phase. Other embodiments include the preparation process combined with using a solvent phase to which the dissolved sacrificial template is added to produce a liquid electrolyte subsequently used in the battery. In some embodiments, the solvent phase contains solvents, salts used to provide working ion conductivity or electrolyte additives, such as those used to control solid-electrolyte interphase (SEI) formation, control gassing, or provide benefits well known to those skilled in the art. In some embodiments, the process includes using a solvent phase that is subsequently removed from the electrode and replaced by an electrolyte.

In some embodiments, a method for preparing a sulfur electrode includes: (a) combining sulfur powder, at least one lithium salt, and an electrically conductive solid; (b) heating the combination of step (a) at a temperature sufficient to melt the sulfur powder but not the lithium salt, thereby causing at least a portion of the sulfur to redistribute in the electrically conductive solid forming a composite; (c) cooling the composite to solidify the sulfur; and (d) extracting the lithium salt from the composite with a solvent.

In some embodiments, the method includes at least one lithium salt selected from the group consisting of LiTFSI and LiFSI. In some embodiments, the method includes electrically conductive solid selected from the group consisting of carbon, graphite, fullerenes, carbon nanotubes, graphene, and graphene oxide. In some embodiments, the method includes a solvent selected from the group consisting of ethylene carbonate, propylene carbonate, butylene carbonate, and their chlorinated or fluorinated derivatives, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate, γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propionitrile, ethyl acetate, methyl propionate, ethyl propionate, dimethyl carbonate, and glymes, including mono-glyme, di-glyme, tri-glyme and tetra-glyme.

In some embodiments, the method includes the heating of step (b) within the temperature range from about 115° C. to about 165° C. In some embodiments, the method includes heating of step (b) to 160° C. In some embodiments, the method includes heating of step (b) for about 5 minutes.

In some embodiments, a sulfur electrode can be prepared by the method as described above. In some embodiments, the sulfur electrode can comprise an electrically conductive solid, at least one lithium salt and sulfur, wherein the lithium salt and sulfur are present in particulate form, and the particles of sulfur have a particle size ranging from about 5 nm to about 500 μm. In some embodiments, the sulfur electrode can comprise an electrically conductive solid and particulate sulfur dispersed in particulate form within the electrically conductive solid, wherein the sulfur has a specific surface area ranging from about 0.3 $m^2/g$ to about 100 $m^2/g$. In some embodiments, an electrochemical cell can comprise the sulfur electrode as described herein. In some embodiments, a battery can comprise the electrochemical cell as described herein.

DETAILED DESCRIPTION

Figures 1A, 1B, 1C:
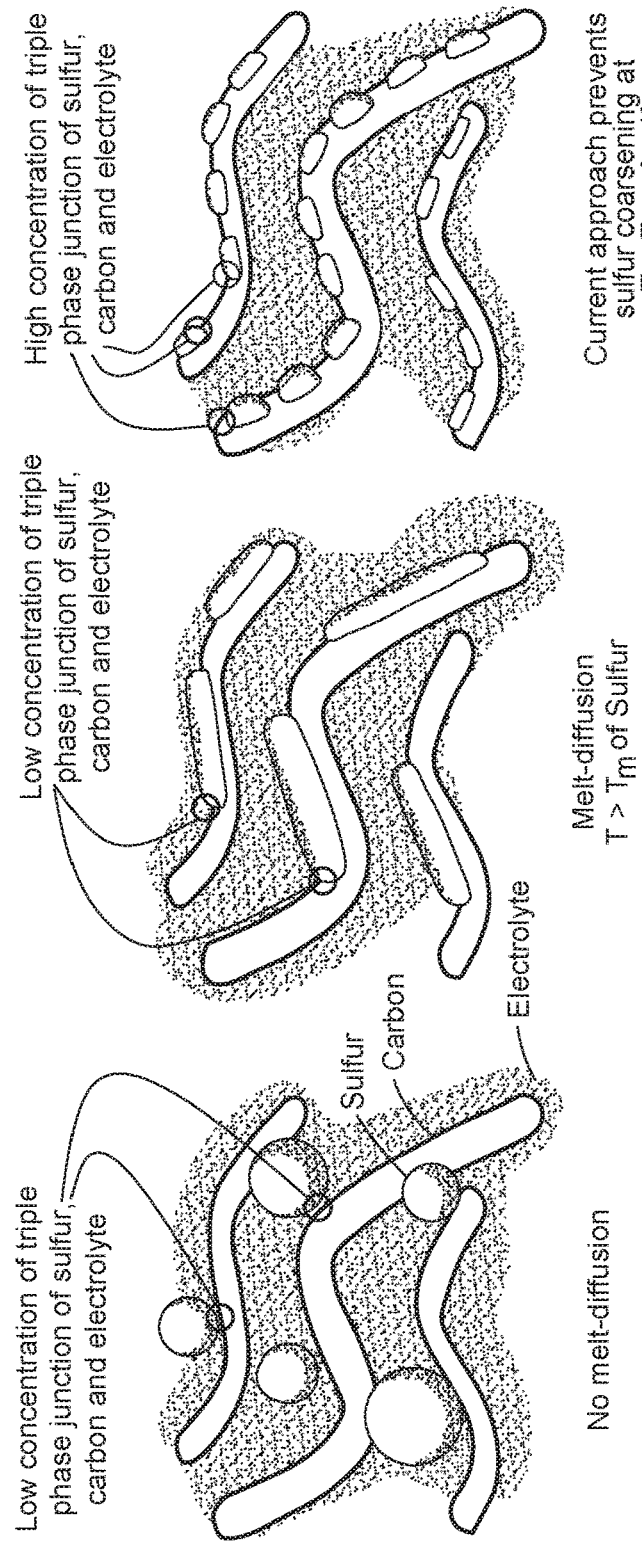
FIG. 1A shows a schematic of a sulfur electrode that includes triple-phase junctions of sulfur, carbon and electrolyte without melt-diffusion.
FIG. 1B shows a schematic of a sulfur electrode that includes triple-phase junctions of sulfur, carbon and electrolyte with melt-diffusion after heating above the melting point of sulfur.
FIG. 1C shows a schematic of a sulfur electrode prepared by pre-mixing a lithium salt in the mixture prior to melt-diffusion to create a high concentration of triple-phase junctions of sulfur, carbon and electrolyte.

Embodiments described herein relate generally to systems and methods of preparing a lithium-sulfur electrode using a sacrificial template.

Despite its attractive promises regarding cost-competitiveness due to the abundancy of sulfur and its non-toxicity, practical applications of Li—S batteries remain a challenge due to the low utilization of sulfur, rapid capacity fading and low areal capacity (<2 mg S/$cm^2$) in the current electrodes. Sulfur (conductivity σ=~5×$10^{-30}$ S/cm @ 25° C.), and its discharge product, $Li_2S$, are electronic insulators; to improve the utilization of the active materials (e.g., sulfur) in a Li—S cell, inactive conductive carbon can be added to form a conductive network within the electrode. In addition, the solubility of intermediate discharge/charge species (lithium polysulfides, $Li_2S_x$ where 4≤x≤8) in organic electrolytes contributes to the loss of active material as these soluble species can diffuse to the lithium anode and be reduced to $Li_2S$, creating an insulating layer which increases the overall impedance of the cell. This internal redox "shuttle" effect eventually leads to capacity fading and poor Coulombic efficiency.

Significant progress has been made in recent years by attempting to confine sulfur and polysulfides within a structured conductive host matrix though engineered structures or chemical modification to provide physical or chemical association with sulfur or $Li_2S$. These strategies include mesoporous carbon particles, graphene-wrapped/coated sulfur, hollow polymeric nanostructure for sulfur, modification to carbon fibers, and conductive polymer coating. Although these studies demonstrated good cycling stability and enhanced utilization of active materials, the low sulfur loading (0.5-2 mg S/cm$^2$) or areal capacity (less than 2 mAh/cm$^2$) remains a limitation of these Li—S cells. To achieve a cost break-even for electric vehicles, a high areal capacity greater than 8 mAh/cm$^2$ (or high sulfur loading of ~7 mg S/cm$^2$) is calculated to be a desired energy density.

There are a number of approaches for preparing sulfur cathodes with a high-sulfur loading. Increasing the sulfur loading can often lead to lowering the specific capacity and/or sulfur utilization for a given loading. For instance, the specific capacity of a sulfur-containing electrode decreased significantly from 820 to 450 mAh/g when the sulfur loading increased from 1.2 to 2.4 mg S/cm$^2$, even though the cell was cycled at a very low current density of 56.6 µA/cm$^2$. One such attempt is through the stacking of carbon fibers mat, which were formed using vacuum filtration process. The achieved areal capacity of 11.3 mAh/cm$^2$ with a sulfur loading of 11.4 mg S/cm$^2$ was achieved at a low electrode density (0.53 g/cm$^3$) producing a moderate volumetric capacity of ~297 mAh/cm$^3$. More critically, a high electrolyte to sulfur ratio (E/S, ml/gS) of 15.6 ml/gS was used (~95 vol % electrolyte in the cathode), which greatly increases the inactive material contribution and significantly lowers the energy density and specific energy of the cell. An electrolyte starved cathode (60-70 vol %) coupled with high sulfur loading of 7 mg S/cm$^2$ (or ~8 mAh/cm$^2$) is a good target to achieve greater than 300 Wh/L of energy density and less than $125/kWh at the cell level.

There are three factors in producing a high areal capacity sulfur cathode: (1) a high concentration of triple-phase junction of the Li ion-conducting electrolyte, electronically-conductive carbon and the sulfur to allow electrochemical reaction to occur during cycling, (2) a low tortuosity pathway in a porous medium to allow increased electrolyte penetration for facile Li ion transport, and (3) a highly-percolating electronically-conductive carbon network to provide good electronic charge transfer.

In some embodiments as described herein, the Li—S electrodes are prepared using a melt-diffusion process aided by an anti-coarsening additive to achieve a favorable combination of high mass loading, high areal capacity, and low electrolyte-to-sulfur (E/S) ratio resulting in high volume capacity. To obtain high performing Li—S electrodes, an exemplary electrolyte salt, such as LiTFSI, is added as a solid phase to the sulfur cathode prior to melt-diffusion. Without wishing to be bound by any particular theory, the inclusion of LiTFSI greatly prevents the coarsening of liquid sulfur while allowing the desired melt-bonding of liquid sulfur to the conductive support. Upon introducing the electrolyte during formation of a cell, the LiTFSI subsequently dissolves in the electrolyte solvent to produce the final electrolyte of the cell.

FIGS. 1A-1C illustrate the effectiveness of the inventive approach as described herein. As shown in FIG. 1A for a Li—S electrode without melt-diffusion, the mixture of sulfur and conductive carbon remains fairly un-wetted within the electrode structure. Since there is not much wetting between the sulfur and the conductive carbon, there is a fairly low concentration of triple-phase junctions. FIG. 1B illustrates the effect of melt-diffusion upon heating the mixture of sulfur and conductive carbon above the melting point of sulfur (115° C.) in order to bond the sulfur securely to the carbon conductor and to infiltrate porosity. However, a fundamental disadvantage of melt-diffusion is the rapid coarsening of liquid sulfur that occurs concurrently. The impact of coarsening can be seen as the reduction in triple-phase junctions, which can lead to low sulfur utilization. During melt-diffusion, two effects are expected: (1) the reactivity of large sulfur particles is diminished for kinetic reasons, and (2) the amount of triple-phase junctions necessary for electrochemical reactions to occur also decreases due to coarsening. This probably accounts for the low sulfur loading (and low areal capacity) in typical Li—S electrodes with less than 2 mg S/cm$^2$.

As illustrated in the schematics of FIG. 1C, the coarsening of sulfur can be prevented by mixing an ion-conducting salt with sulfur and conductive carbon before the onset of melt-diffusion. Upon thorough mixing of the salt, the sulfur and conductive carbon, the mixture becomes intimately mixed. The subsequent heating of the mixture above the melting point of sulfur below the melting point or decomposition point of the ion-conducting salt) allows sulfur to melt-diffuse or redistribute onto conductive carbon while the ion-conducting salt remains interstitially in the mixture. Upon cooling the mixture, the salt prevents the sulfur from coalescing to large particles (i.e., coarsening) and the sulfur remains small and wetted to the conductive carbon, leading to a high surface interface area between sulfur and carbon per a given volume. Thus this heating-cooling process with the addition of ion-conducting salt produces a high concentration of triple-phase junctions in sulfur electrodes. The high concentration of triple-phase junctions allows more electrochemical reactions to take place for a given quantity and thus leads to a higher capacity to be extracted as compared to an electrode without this modification. For example, a 250 µm-thick sulfur/carbon nanotube (CNT) electrode with a porosity of 36% has a capacity of ~300 mAh/g at C-rate of 1/30 h$^{-1}$ and a corresponding current density of 0.7 mA/cm$^2$. The comparable electrode prepared with the same sulfur loading using the approach as described herein produces a sulfur electrode with a threefold higher specific capacity of 867 mAh/g and a high areal capacity of 10.5 mAh/cm$^2$.

Furthermore, the performance of the Li—S electrodes and cells can be enhanced by optimizing the carbon architecture as well, for example, by using conductive carbon of different types and/or with different form factors. Overall, the Li—S batteries prepared as described herein can achieve areal capacity greater than 8.7 mAh/cm$^2$ for a range of current densities (0.7 to 2.6 mA/cm$^2$). These Li—S cells are produced with an electrolyte starved cathode where the E/S ratio was 3 mL/gS (~70 vol % of electrolyte in the cathode).

Figure 2A:
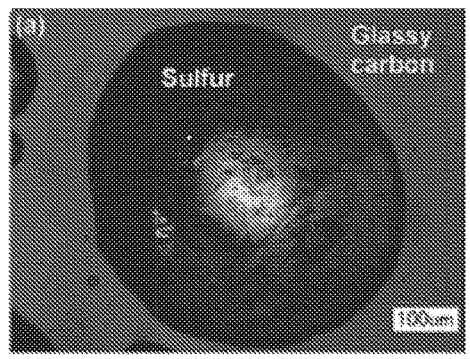
FIG. 2A shows a confocal micrograph of the sulfur.
Figure 2B:
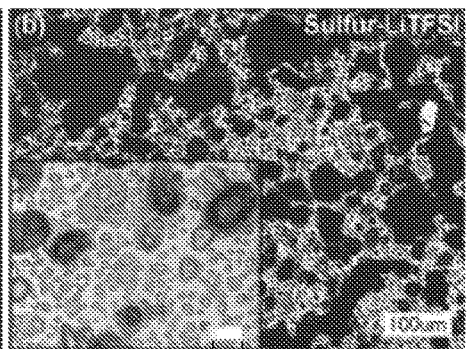
FIG. 2B shows a confocal micrograph of the mixture of LiTFSI and sulfur on glassy carbon after both samples were heated at 160° C. for 5 min. The higher magnification in the inset shows the small droplets of solidified sulfur.
Figure 2C:
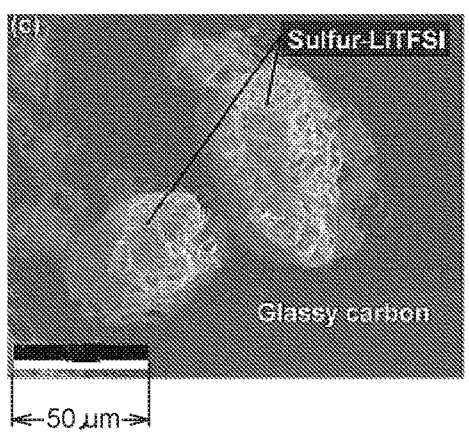
FIG. 2C shows a scanning electron microscopy (SEM) micrograph of solidified sulfur particles shown in FIG. 2B.
Figure 2D:
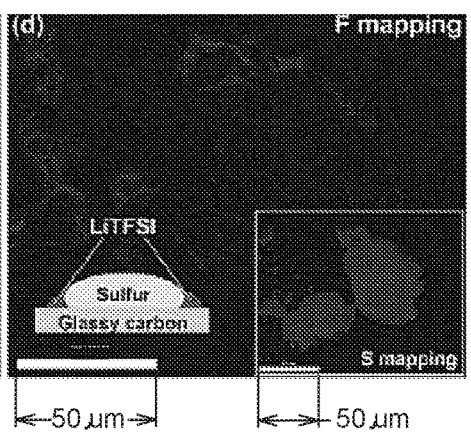
FIG. 2D shows an energy dispersive x-ray spectroscopy (EDX) mapping of elemental fluorine (F) and sulfur (S), with the preferential location of LiTFSI at the triple phase junction.

Melting of the sulfur results in the coalescing of smaller sulfur particles and the formation of larger solidified sulfur particles, as shown in FIG. 2A. Such a phenomenon can reduce the triple-phase junctions that are necessary for electrochemical reactions and lower the utilization of sulfur, especially for high-areal capacity sulfur, as ions or electrons cannot pass through the insulating sulfur. The addition of a lithium salt, such as LiTFSI, to the mixture can prevent the coarsening of sulfur during the melt-diffusion process, as shown in FIG. 2B. Sulfur particles of 10-100 µm as shown in the micrograph are observed on the glassy carbon plate and there is little sign of sulfur coarsening during the heat treatment. FIGS. 2C and 2D show an electron micrograph and an energy dispersive x-ray spectroscopy (EDX) mapping, respectively, of the fluorine elements suggests that LiTFSI surrounds the sulfur particles instead of forming a homogenous mixture. This shows that LiTFSI serves as a barrier or a coating to prevent the sulfur particles from coalescing. Brunnauer-Emmett-Teller (BET) analysis further confirmed this result. The specific surface area (SSA) of the pristine sulfur particles after heating at 160° C. is 0.12 m²/g while SSA of the sulfur from the S-LiTFSI mixture is 0.39 m²/g, about 3 times higher as shown in Table 1.

TABLE 1

BET surface area measurements of S-LiTFSI samples show the anti-coarsening effect of LiTFSI.

| Sample | Surface area (m²/g) |
|---|---|
| (a) Sulfur | 0.12 |
| (b) S-LiTFSI composite (Heated at 160° C.) | 0.42 |
| (c) S-LiTFSI composite (Heated at 160° C., then LiTFSI removed) | 0.39 |
| (d) LiTFSI (Heated at 160° C.) | 0.39 |

Surface areas of sample (a) sulfur (as-received); (b) S-LiTFSI composite after heating to 160° C.; (c) Heated composite of S-LiTFSI after soaking in mono-glyme and drying in argon to remove LiTFSI; and (d) LiTFSI after heating to 160° C. The 3x increase in the surface area of the sulfur using the approach as described herein shows that coarsening of sulfur was prevented, consistent with the observation in FIGS. 2A-2F.

Figure 2E:
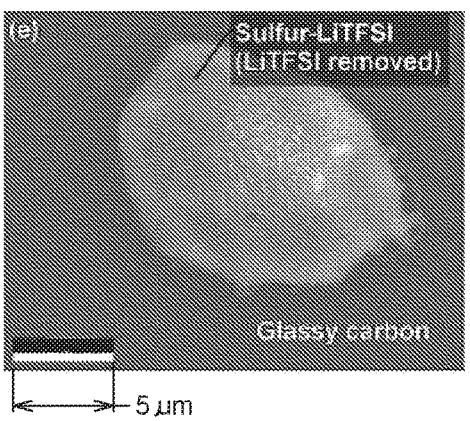
FIG. 2E shows a SEM micrograph of the sample, shown in FIG. 2C after it was soaked in mono-glyme for 1 hour and dried overnight.
Figure 2F:
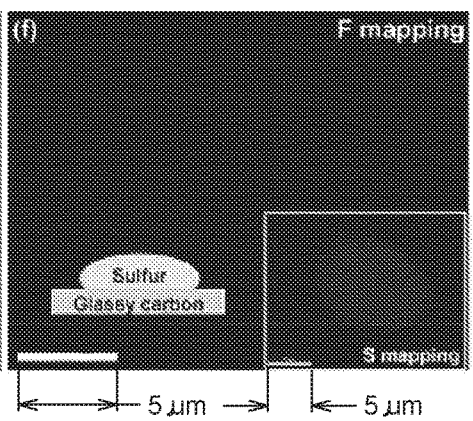
FIG. 2F shows the corresponding EDX mapping of the sample shown in FIG. 2E after LiTFSI is dissolved in the mono-glyme, which leaves behind a solidified sulfur particle.

It is noted that the S-LiTFSI mixture is soaked in mono-glyme solvent to remove the LiTFSI. In addition, this is remarkably similar to pristine LiTFSI after heating (0.39 m²/g), which suggests that the molten sulfur attaches to the LiTFSI during heat treatment. The mixture of the S-LiTFSI exhibits a surface area of 0.39 m²/g and 0.42 m²/g before and after soaking in mono-glyme to remove the LiTFSI, as shown in FIGS. 2E and 2F. Since LiTFSI can dissolve in the electrolyte as confirmed by the EDX analysis, there is no wastage of material as LiTFSI is a lithium conducting salt. Measuring the conductivity of the sample soaked in TEG-DME solution shows that a ~7% increase in conductivity, supporting the EDX analysis that the LiTFSI dissolved. This observation suggests a possible interaction between LiTFSI and sulfur. The product (S-LiTFSI) can dissociate to S-TFSI⁻ and Li ion (Li⁺) in TEG-DME. i.e.,

S-LiTFSI->S-TFSI⁻+Li⁺     (1)

The presence of sulfur makes S-TFSI⁻ more stable than TFSI⁻. Hence, the higher ionic conductivity as observed.

Figure 3A:
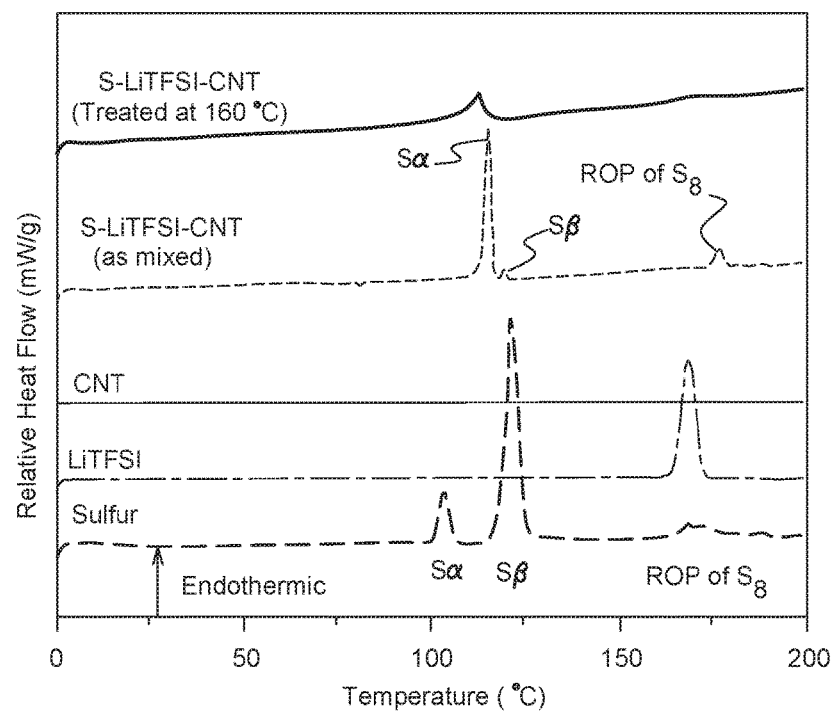
FIG. 3A shows a differential scanning calorimetry (DSC) of the S-LiTFSI-CNT electrode mixture before and after heating, and of the individual components in the electrode.

The interaction between the LiTFSI and sulfur was probed using differential scanning calorimetric (DSC), Fourier transform infrared spectroscopy (FTIR) and X-ray photoelectron spectroscopy (XPS) analytical techniques. FIG. 3A shows the DSC profile of the electrode before heating, which displays all the characteristics endothermic peaks of elementary sulfur, albeit at different intensities and peak positions. The first endothermic peak of the elementary sulfur at 105° C. corresponds to the phase transformation of α-$S_8$ to monoclinic β-$S_8$ while the second peak at 123° C. corresponds to melting of the β-$S_8$. The board peak observed at 160° C. corresponds to the polymerization reaction of melted sulfur on heating. In contrast, the disappearance of heat of polymerization for the heated sample shows that the completion of reaction or simply implying that there is very low concentration of cyclic sulfur. The melting peak of the sulfur observed to be shifted to the lower temperature due to the confined environment of the sulfur and the presence of "impurities," which in this case is the LiTFSI. In addition, the one melting peak in S-LiTFSI-CNT sample after heat treatment suggests a single phase for the sulfur. Without being bound by any particular scientific interpretation, the polymerization of the sulfur may be associated with transition of a ring to a linear structure. During this process, the lone pair electrons of the N atom of the LiTFSI may attach themselves to the linearized sulfur owning to its electronic deficiencies. Such a structure of S-LiTFSI would be chemically stable to prevent the reversible depolymerization of linearized sulfur on slow cooling. This can explain the absence of melting and polymerization peaks of the electrode after heat treatment. Furthermore, the preservation of the phase transition peak of sulfur of this sample is consistent with the presence of sulfur chains.

Figure 3B:
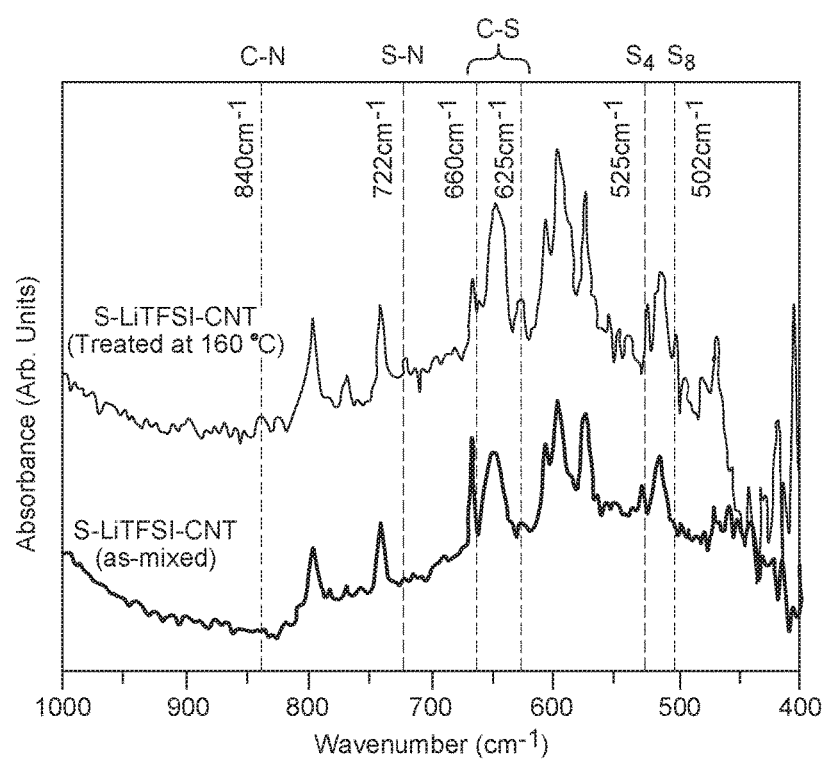
FIG. 3B shows a Fourier transform infrared (FTIR) spectroscopy of S-LiTFSI-CNT before and after heating, which shows the interaction between sulfur and CNT (C—S bonds), and product of S-LiTFSI (S—N bonds) for the S-LiTFSI-CNT after treated at 160° C.
Figure 3C:
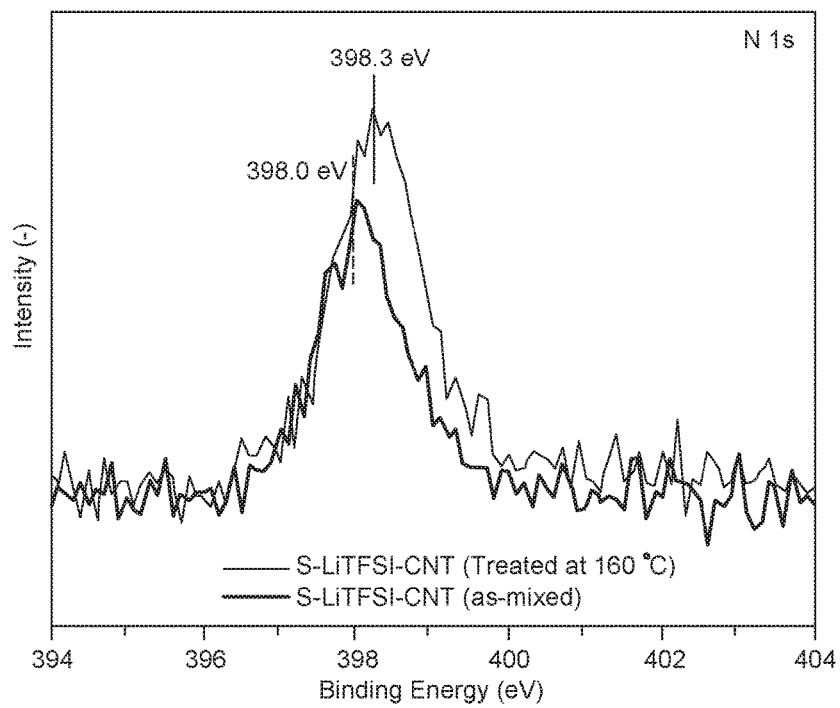
FIG. 3C shows an x-ray photoelectron spectroscopy (XPS) of S-LiTFSI-CNT after it is heated at 160° C., which shows an increase in binding energy of N 1 s.
Figure 3D:
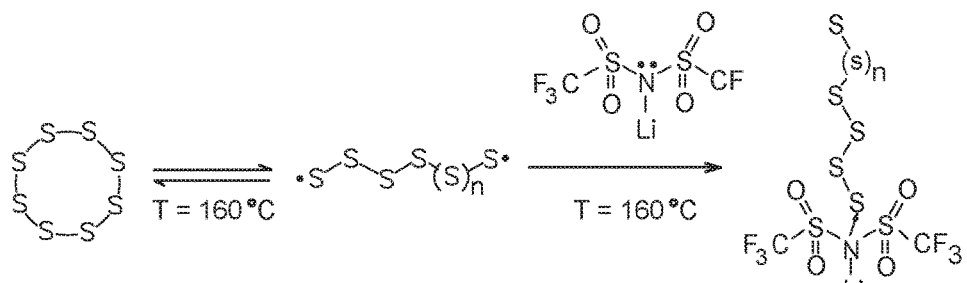
FIG. 3D shows an illustration of a proposed possible interaction between sulfur and LiTFSI based on the DSC, FTIR and XPS examinations shown in FIGS. 3A-3C.

The attachment of sulfur to the LiTFSI moiety in the electrode after heating at 160° C. was further confirmed independently by FTIR and XPS analysis, as shown in FIGS. 3B and 3C. The new peak for the heated sample at 722 cm⁻¹, which corresponds to the sulfur-nitrogen (S—N) bonding, indicates the formation of S-LiTFSI after the reaction. The 525 cm⁻¹ peak of the heated sample is attributed to the $S_4$, which suggests that the formation of $S_4$-LiTFSI during the reaction. Thermodynamic considerations and theoretical calculations have indicated that $S_n$ molecules, 6<n<12, have the tendency to exist as rings in all phases. Hence, there remains the possibility of bonding breaking of the longer-chain-length of linear $S_8$ to $S_4$ during the reaction with LiTFSI. The peak at 502 cm⁻¹ can be assigned the heated sample to be Se-LiTFSI. Narrow sharp peaks at 625 and 660 cm⁻¹ of the heated sample are assigned to the stretching motion of C—S bond. This supports the notion that the melted sulfur bonds with the CNTs. The peak at 840 cm⁻¹ can be due to the C—N stretching bonds for the heated sample, which suggests the possibility of LiTFSI interacting with CNT. Finally, XPS analysis reflects an increase of the binding energy associated with N1s after the electrode underwent heat treatment, as shown in FIG. 3C. This difference is attributed to the dative bond between N (of the LiTFSI) and S as compared to the lone pair of electrons on the N (of LiTFSI). It is thus evident that S-LiTFSI is indeed formed after heat treatment of the electrode and a possible reaction mechanism is proposed in FIG. 3D.

Figure 4A:
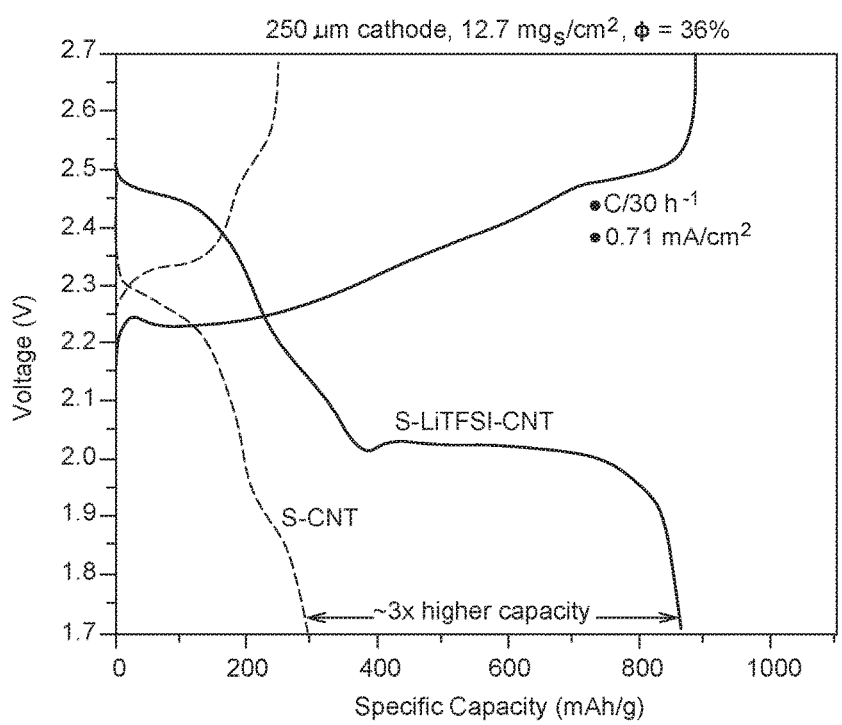
FIG. 4A shows the second cycle galvanostatic discharge/charge profiles comparing a S-LiTFSI-CNT composite electrode (solid line) and a S-CNT composite electrode (dashed line) where both electrodes were heated at 160° C., which is above the melting point of sulfur.

In some embodiments, the galvanostatic charge/discharge behavior of the Li—S battery is evaluated within a potential window of 1.7-2.7 V vs Li⁺/Li⁰. The terminal discharge potential of 1.7 V prevents the irreversible reduction of $LiNO_3$ additive, which is added to the electrolyte to minimize the capacity fading due to lithium polysulfide shuttle mechanism by complex reactions on Li metal through forming a stable solid-state electrolyte interfaces (SEI) on the surface of Li. FIG. 4A shows the voltage-capacity profiles of S-LiTFSI-CNT compared to S-CNT at a C-rate of 1/30 h⁻¹ (current density of 0.7 mA/cm²) of a 250-μm thick cathode. In the text, a dash line (-) means that the mixture was heated at 160° C. while a slash (/) means that the mixture was physically mixed. For instance, S-LiTFSI-CNT means that the mixture of S, LiTFSI and CNT was heated at 160° C. The signature voltage profile of sulfur cathode was observed for the S-LiTFSI-CNT: The reduction of elemental sulfur ($S_8$) to long-chain lithium polysulfides ($Li_2S_x$, 4≤x≤8) at 2.5-2.1 V and the formation of short chains $Li_2S_2/Li_2S$ at 2.1 V. The discharge capacity of the 2nd discharge cycle was 1,030 mAh/g and is ~3 times higher than the pristine sulfur (330 mAh/g). The $2^{nd}$ discharge cycle is used as a comparison as the $1^{st}$ discharge cycle usually contains side reactions. In the case of pristine sulfur, the discharge plateau of the long-chain lithium polysulfides is about half of that of the S-LiTFSI-CNT (200 mAh/g vs 400 mAh/g) and the discharge plateau of short chains $Li_2S_2/Li_2S$ is almost negligible. This is significant as the lower plateau possesses a theoretical capacity of 1,256 mAh/g. This trend is also evident in the reverse reactions, where the oxidation of $Li_2S$ to S, are displayed in the charge curve. The higher polarization by comparing the discharge and charge profile of the S-CNT cathode suggests kinetically inefficient reaction process usually associated with high areal capacity. The spectra were fitted with the equivalent circuit shown as inset and the Ohmic resistance ($R_1$) is attributed to the ion conduction in the liquid electrolyte, $R_2$ and $R_3$ is attributed to charge transfer and/or interfacial resistance, and $W_{o1-R}$ is attributed to the liquid state open circuit electrolyte diffusion. From the fitting parameters Q and n, a capacitance C can then be calculated according to equation $C=(R^{1-n} \cdot Q)^{1/n}$. Capacitance of $R_3$ (~$10^{-5}$ F) is higher than $R_2$ (~$10^{-7}$ F) means $R_3$ most probably due to the charge transfer resistance and $R_2$ appears to be resistance of electronic conductivity of solid electrode. Comparing the two impedance spectra indicated that the S-LiTFSI-CNT electrode has much lower charge transfer resistance than S-CNT.

Figure 4B:
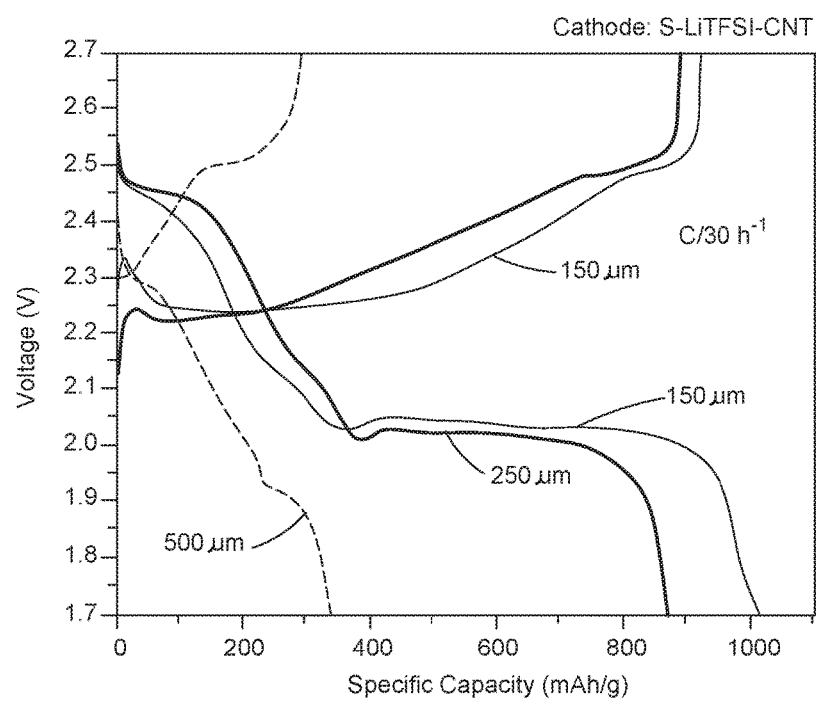
FIG. 4B shows the effect of electrode thickness in S-LiTFSI-CNT composite electrodes on the specific capacity for the electrodes having the same porosity of 36% at the C-rate of C/30 $h^{-1}$.

FIG. 4B shows the $2^{nd}$ cycle of the galvanostatic discharge/charge profile of the Li—S battery comparing the different thickness of S-LiTFSI-CNT cathode. The specific capacities obtained for the 2nd discharge cycle at a C-rate of $1/30$ $h^{-1}$ are in the order of electrode thickness, i.e., 1015 mAh/g, 867 mAh/g, and 333 mAh/g for 150 μm, 250 μm, and 500 μm, respectively. Although the areal capacity of the 250 μm-thick-electrode was 10.5 mAh/cm², which is higher than the 150 μm-thick-electrode at 8.1 mAh/cm², the polarization for the 250 μm-thick-electrode is slightly greater than the thinner one (150 μm) during charging and discharging (~500 mV). This is reasonable as the charge transport now occurs over a greater length scale through the thicker electrode and a larger driving force (potential) is required. Further increasing the electrode thickness to 500 μm resulted in significant decrease of specific capacity and areal capacity to 330 mAh/g and 7.35 mAh/cm². The large increase in polarization shows that charge transport through this length scale is difficult even with S-LiTFSI-CNT cathode. On the other hand, the exact same examination for the conventional S-CNT found that even at the thinnest electrode at 150 μm, not much capacity can be extracted compared to the LiTFSI grafted cathode. The increased in polarization is noted with the S-CNT cathodes. In all these electrochemical cyclings, it is worth noting that the specific capacities achieved are less than 1250 mAh/g (or ~1.5 electrons transfer per sulfur atom) but not at the theoretical value of 1675 mAh/g due to the limitation in electrochemical kinetics.

Figure 4C:
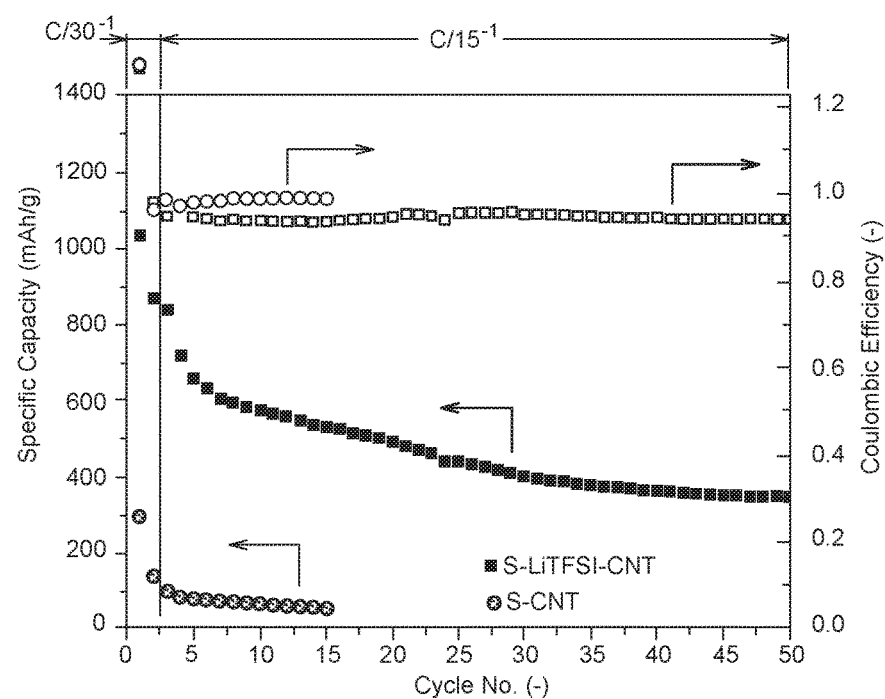
FIG. 4C shows the cycle life and coulombic efficiency profiles of the Li—S cells with the same electrodes used in FIG. 4A.

In another example, taking the 250 μm S-LiTFSI-CNT electrode as reference, the cycling test is performed against the 250 μm thick S-CNT electrode. FIG. 4C shows the Coulombic efficiencies greater than 93% can be achieved for the S-LiTFSI-CNT over 50 cycles. Although higher Coulombic efficiencies are recorded for the S-CNT, the low specific capacities over the 15 cycles mean that such electrode cannot complete with the current state-of-the-art lithium-ion technology. On the whole, the observed capacity fading for both electrodes is attributed to the "shuttle effect" discussed earlier. The above results seems to verify that a high concentration of triple-phase junctions of the Li ion-conducting electrolyte, electronically-conductive carbon and the sulfur to allow reactions to occur during cycling is achieved by melt-diffusion while preventing the coarsening of the melted sulfur.

Figure 5A:
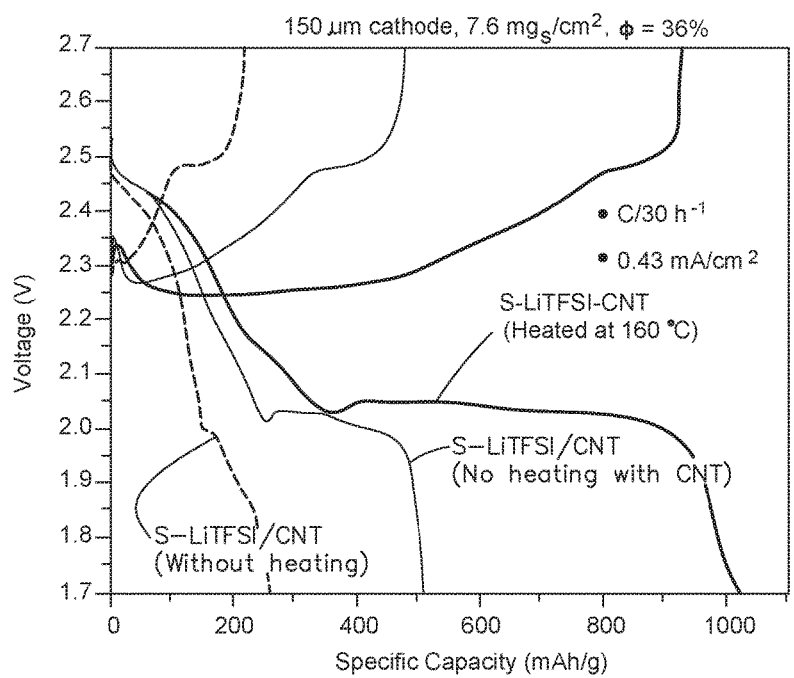
FIG. 5A shows the second cycle galvanostatic discharge/charge profiles comparing results for different methods of cathode preparation.

In another example, a cathode prepared with and without melt-diffusion are compared. As shown in FIG. 5A, the cathode with melt-diffusion exhibited ~2 times higher capacity than a cathode that did not undergo the melt-diffusion process. In the latter, the LiTFSI is heated with sulfur to prevent the coarsening of sulfur (S-LiTFSI) in the absence of CNT. The polarization is considerably higher for the cathode without the melt-diffusion process—an indication of the poor contact between the sulfur and carbon; hence, the higher impedance of the cell. Moreover, a cathode made from mixing the equivalent mass of the LiTFSI, S and CNT showed 250 mAh/g of capacity. This trend holds with increasing electrode thickness. At 250 μm, the difference in the specific capacity is 5 times. However, the same performance of the cathode (S-LiTFSI) with and without melt diffusion at 100 μm-thickness indicates that electrolyte-transport becomes limiting for electrode thicker than 100 μm. This clearly illustrates that having a good contact between sulfur and carbon while preventing sulfur coarsening enables the achievement of a high areal capacity cathode.

Figure 5B:
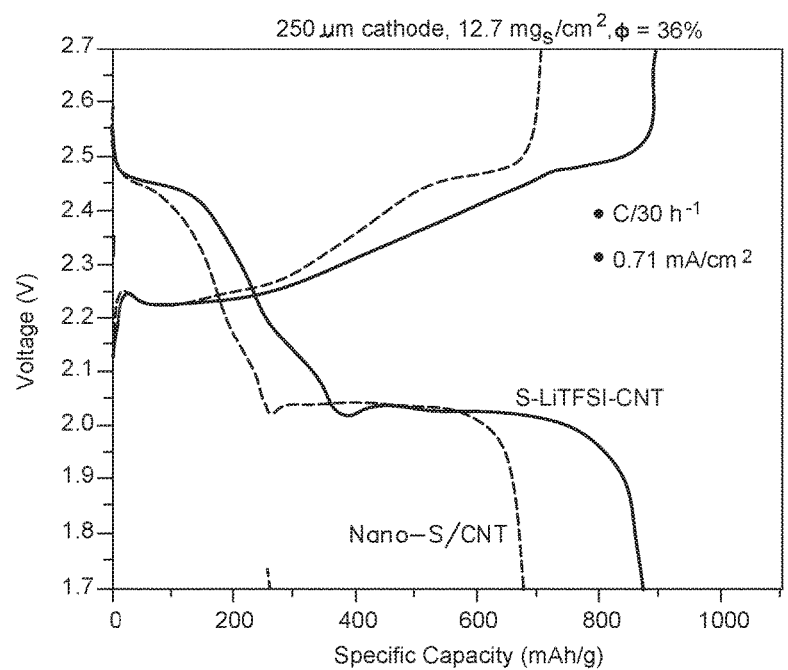
FIG. 5B shows the second cycle galvanostatic discharge/charge profiles of the Li—S electrodes, comparing between sulfur obtained by the different preparation methods of (black) coarsening-preventive method and nano-sized sulfur.
Figure 5C:
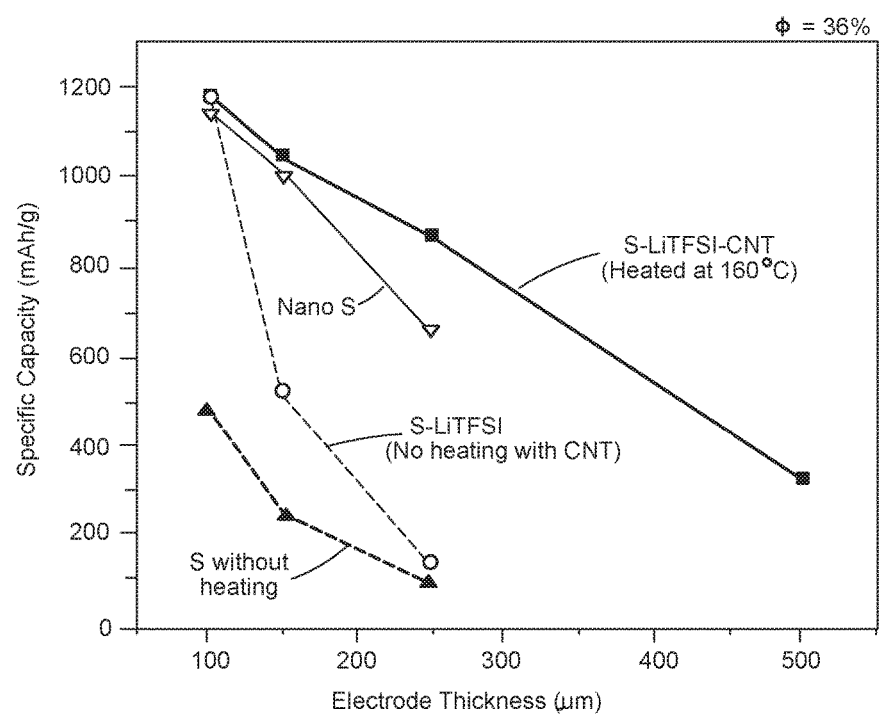
FIG. 5C shows the effect of electrode thickness on the specific capacity (based on the second galvanostatic cycle) of the cathode for the different cathode preparation method described in FIGS. 5A and 5B.

In another experiment, nano-sulfur particles less than 100 nm are used to achieve a positive effect on the extracted capacity. At 250 μm of thickness, the higher capacity of the cathode prepared by a melt-diffusion process indicates the importance of a high concentration of triple-phase junctions for high areal capacity electrode where electrolyte-transportation plays an important role as shown in FIG. 5B. However, at an electrode thickness less than 150 μm, the sulfur created by the technique as described herein has remarkably similar performance to cathodes using nano-sized sulfur (with less than 100 nm particle size), as shown in FIG. 5C. In all, these experiments demonstrate that coarsening of sulfur can be prevented during the melt-diffusion process. As shown repeatedly, bigger particles have lesser contact (interface) with the conductive matrix and hence, lower sulfur utilization. It is noted that although nano-sulfur based cathodes can provide good performance at modest electrode thickness of less than 150 μm, the cost of nano-sulfur is about 4 orders of magnitude higher than precipitated sulfur ($35 per grams of nano-sulfur compared to $0.03 per grams of precipitated sulfur). Such high cost of nano-sized sulfur would make Li—S batteries much more expensive than today's Li-ion batteries; hence, this would be an impractical approach towards commercialization of Li—S batteries.

Figure 6A:
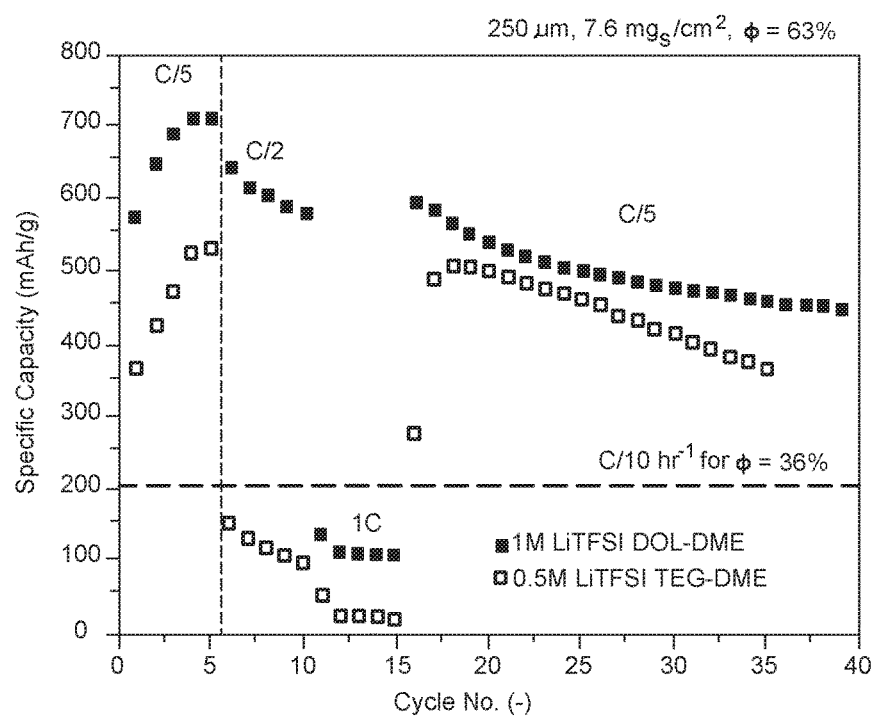
FIG. 6A shows the effect of porosity, electrolyte, surface area of CNT and $LiNO_3$ additive on rate performances of the Li—S cells with a S-LiTFSI-CNT composite cathode prepared using 2 different type of electrolytes: 1M LiTFSI and 0.2M $LiNO_3$ dissolved in DOL-DME (v/v=1:1) 0.5M LiTFSI and 0.15M $LiNO_3$ dissolved in TEG-DME.
Figure 6B:
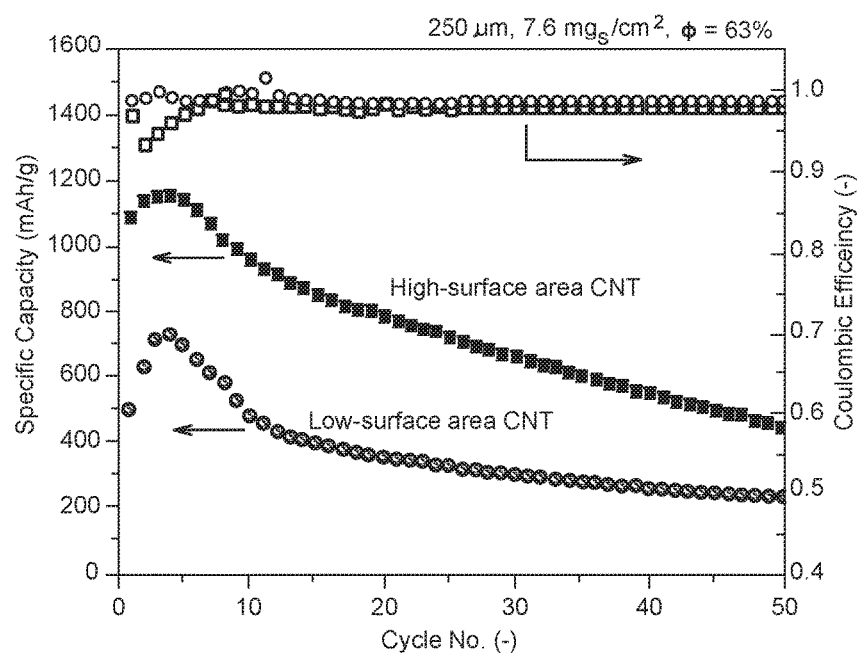
FIG. 6B shows the cycle life and coulombic efficiency profiles of the Li—S cells comparing composites with a high-surface area CNT greater than 500 $m^2/g$ and a low-surface area CNT less than 40 $m^2/g$ at a C-rate of 1/5 $h^{-1}$.
Figure 6C:
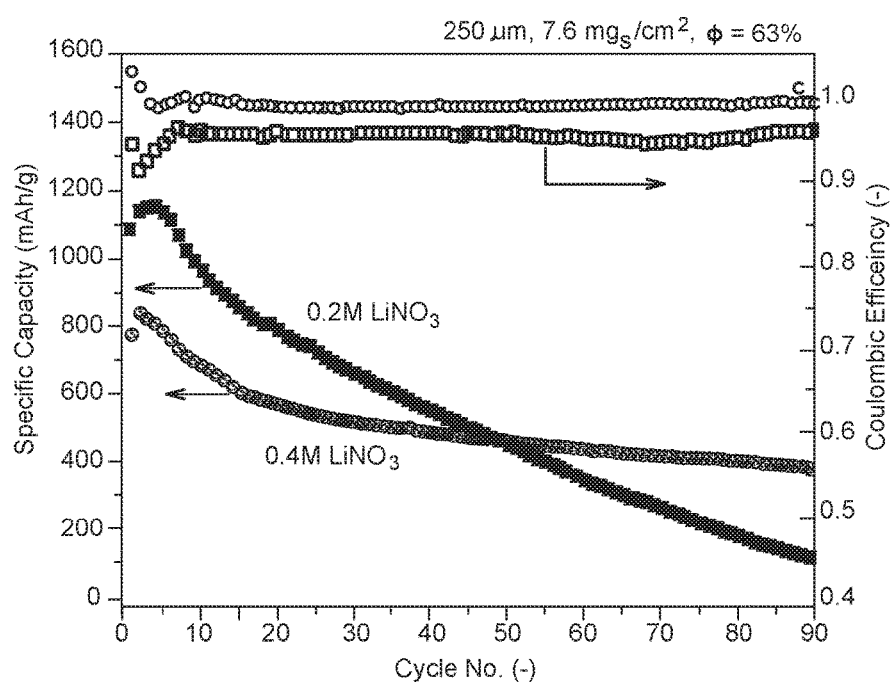
FIG. 6C shows the cycle life and coulombic efficiency of Li—S cells that include S—LiTFSI-CNT composite cathodes with 0.2M and 0.4M $LiNO_3$ additives and CNT with greater than 500 $m^2/g$ specific surface area.

In some experiments as described herein, the Li—S cells prepared with the melt-diffusion process gave poor specific capacities when cycled at a higher C-rate. For instance, only about 200 mAh/g of capacity is extracted when operated at $C/10$ $h^{-1}$. It is possible that the electrolyte transport is limiting the rate capability. By increasing the porosity from 36% to 63%, the Li—S batteries are able to cycle at higher C-rates with modest capacity, as shown in FIG. 6A. A $C/5$ $h^{-1}$ rate gives a capacity of ~500 mAh/g at a porosity of 63%. The high rate capability is a clear indication that electrolyte transport is much faster with higher porosity and lower tortuosity τ. FIGS. 6A-6C show the contrast between two electrodes with different porosities. This is in line with the Bruggeman relationship $\tau \Box \varepsilon^{-0.5}$ where ε is the pore fraction. This is analogous to having a thick electrode for transition metal oxide electrodes where ionic transport becomes a challenge and pore channels have to be engineered to provide low tortuosity pathway for the ions to fully utilize the active material. Moreover, using a lower viscosity of solvent of DOL:DME, the capacity further increased across the different cycling rates which validates the argument that the electrolyte-transport is the rate-limiting step. The viscosities or wetting of the solvent can influence the penetration of electrolyte. Another criterion is the surface area of the CNT. The higher surface area the conductive carbon can provide, the more sites for the deposition of the sulfur during cycling can be created. The increase in specific capacity illustrated this improvement, as shown in FIG. 6B. It is noted that the capacity increased during the initial cycles may be due to the slow penetration of electrolyte into the electrode, which has been observed previously even at low sulfur loading of 1.4 mg S/cm².

With the knowledge that high-surface area CNT and a modest porosity greater than 60%, the areal capacity can be improved through the electrode thickness. It has been shown that the specific capacity decreased with electrode thickness. However, the areal capacity peaked at ~330 µm, giving rise to ~10.7 mAh/cm$^2$. The downside is that polarization increased with electrode thickness. This means that ionic transport is limiting the performance of the Li—S cells.

The Li—S cycle life remains an issue for electrolyte-starved battery (60-70 vol % of electrolyte). The amount of LiNO$_3$ might not be sufficient to compensate for the need to refresh solid electrolyte interface (SEI) with time. Considering the amount of lithium moved (~40 µm/cm$^2$) for high areal capacity cathode (8 mAh/cm$^2$), additional protection of lithium might be needed. A test of using higher amount of LiNO$_3$ (0.4 M) results in lower capacity fading, as shown in FIG. 6C, albeit a larger polarization.

The detailed analysis establishes the required design for high areal capacity, binder-free electrodes. Adding LiTFSI to the mixture prior the melt-diffusion process can prevent sulfur particles from coalescing (coarsening). This allowed higher areal capacities for sulfur-based cathodes, hereby significantly increasing the Li—S energy density. Overall, the preparation methods as described herein for making cathode material can significantly reduce the manufacturing cost towards cheap energy storage as no drying or use of unnecessary solvent is required. The traditional tape casting is neither the optimal or practical approach for high-areal-capacity sulfur cathode due to the poor adhesion of the material to the current collector at high sulfur loading.

In some embodiments, a method for preparing a sulfur electrode comprises combining sulfur powder, at least one lithium salt, such as LiTFSI ((Lithium bis-(trifluoromethanesulfonyl)imide), and an electrically conductive solid, such as conductive carbon, to produce a mixture, heating the mixture at a temperature sufficient to melt the sulfur powder but not the lithium salt, thereby melt-diffusing at least a portion of the sulfur to wet the conductive solid to form a composite, cooling the composite to solidify the sulfur, and extracting the lithium salt from the composite with a solvent to form an electrochemical cell.

In some embodiments, the mixture is heated above the melting point of sulfur. In some embodiments, the mixture is heated above 110° C., above 112° C., above 114° C., above 115° C., above 116° C., above 118° C., above 120° C., above 125° C., above 130° C., above 135° C., above 140° C., above 145° C., above 150° C., above 155° C., above 160° C., above 165° C., above 170° C., above 175° C., above 180° C., above 185° C., above 195° C. or above 200° C., inclusive of all temperatures therebetween.

In some embodiments, the mixture is heated for about 30 seconds, about 1 minute, about 2 minutes, about 3 minutes, about 4 minutes, about 5 minutes, about 6 minutes, about 7 minutes, about 8 minutes, about 9 minutes, about 10 minutes, about 12 minutes, about 14 minutes, about 16 minutes, about 18 minutes, about 20 minutes, about 25 minutes, about 30 minutes, about 35 minutes, about 40 minutes, about 45 minutes, about 50 minutes, about 55 minutes, about 65 minutes, about 70 minutes, about 75 minutes, about 80 minutes, about 85 minutes, about 90 minutes, about 100 minutes, about 110 minutes, about 120 minutes, about 130 minutes, about 140 minutes, about 150 minutes, about 160 minutes, about 170 minutes, about 180 minutes, about 190 minutes, about 200 minutes, about 250 minutes, or about 300 minutes, inclusive of all time durations therebetween.

In some embodiments, the electrolytes can include a non-aqueous liquid electrolyte that can include polar solvents such as, for example, alcohols or aprotic organic solvents, a family of cyclic carbonate esters, such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents include γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, glymes, including mono-glyme, di-glyme, tri-glyme and tetra-glyme, and the like. These non-aqueous solvents are typically used as multicomponent mixtures, into which a salt is dissolved to provide ionic conductivity. Some exemplary salts to provide lithium conductivity include LiClO$_4$, LiPF$_6$, LiBF$_4$, LiTFSI, LiBETI, LiBOB, and the like.

In some embodiments, a material used as a battery electrode can comprise a solid-state sacrificial template and sulfur, which when heated undergoes reduced coarsening of the sulfur, thereby increasing the electrochemical activity of the electrode. Unlike previous methods of producing finely divided or high surface area sulfur such as infiltration of molten sulfur into nanoporous or mesoporous carbons, the present invention increases the electrochemical activity of sulfur by providing a higher surface area template for sulfur to conform to, instead of coarsening into large particles of lower specific surface area. In some embodiments, the solid state sacrificial template has a melting or decomposition temperature higher than that of sulfur. When heated to above the melting point of sulfur during the processing of the electrode, the solid-state template remains in the solid form when the sulfur is molten.

In some embodiments, the battery electrode can include sulfur particulates or powders. In some embodiments, the powders/particulates can be about 5 nm to about 500 µm. In some embodiments, the powders/particulates can be about 50 nm to about 500 µm. In some embodiments, the powders/particulates can be about 500 nm to about 500 µm. In some embodiments, the powders/particulates can be about 5 µm to about 500 µm. In some embodiments, the powders/particulates can be about 50 µm to about 500 µm. In some embodiments, the powders/particulates can be about 50 nm to about 50 µm. In some embodiments, the powders/particulates can be about 50 nm to about 5 µm. In some embodiments, the powders/particulates can be about 50 nm to about 500 nm. In some embodiments, the powders/particulates can be about 5 nm to about 50 nm. In some embodiments, the powders/particulates can have an average size about 5 nm, 10 nm, 15 nm, 20 nm, 25 nm, 30 nm, 40 nm, 50 nm, 60 nm, 70 nm, 80 nm, 90 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1 µm, 1.1 µm, 1.2 µm, 1.3 µm, 1.4 µm, 1.5 µm, 1.6 µm, 1.7 µm, 1.8 µm, 1.9 µm, 2 µm, 2.5 µm, 3 µm, 3.5 µm, 4 µm, 4.5 µm, v, 5 µm, 6 µm, 7 µm, 8 µm, 9 µm, 10 µm, 12 µm, 14 µm, 16 µm, 18 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm, 150 µm, 200 µm, 250 µm, 300 µm, 350 µm, 400 µm, 450 µm, or 500 µm, inclusive of all sizes therebetween. In some embodiments, the powders/particulates have a narrow particle size distribution. In some embodiments, the powders/particulates have a wide particle size distribution. In various embodiments, this provides a sulfur electrode "mixture" comprising an electrically conductive solid as described herein, at least one lithium salt, and sulfur, in which the presence of the lithium salt, as described herein, prevents the coarsening of sulfur during thermal processing. The resulting sulfur electrode mixture, prior to extraction of at least a portion of the lithium salt with a suitable solvent or electrolyte as described herein (i.e., substantially free of electrolyte), has sulfur particles of the sizes and ranges described herein.

In some embodiments, the solid state sacrificial template is soluble in the electrolyte of the battery. This allows the sacrificial template to be partially or completely removed by dissolution into the electrolyte. In some embodiments, the electrolyte is an inorganic solid, a polymer, or a liquid. The solvent of the electrolyte phase may be solid or liquid. Examples include oxide or sulfide solid electrolytes, solid polymer electrolytes such as those based on polyethylene oxide in neat or copolymer or block copolymer form, and liquid electrolytes including but not limited to nonaqueous electrolytes such as those comprising carbonates, glymes, ethers, DOL-DME, ketones, ionic liquids, and the like, or aqueous electrolytes. In some embodiments, the electrolyte phase comprises a redox mediator. A redox mediator in the electrolyte phase increases the rate of electronic charge transfer and increases the electrochemical reactivity of the sulfur. In some embodiments, the sacrificial template when dissolved in the electrolyte increases the working ion conductivity of the electrolyte. The sacrificial template material, upon dissolution into the electrolyte, may serve to beneficially increase the ion conductivity of the electrolyte phase.

In some embodiments, the sacrificial template comprises any salt that can dissolve in a solvent. In some embodiments, the sacrificial template comprises a metal salt. Metal salts are commonly dissolved in solvents to provide cationic or anionic conductivity. In some embodiments, the sacrificial template comprises an alkaline metal salt. In some embodiments, the sacrificial template comprises a lithium salt, including but not limited to LiTFSI and LiFSI. In some embodiments, the lithium salts used to impart lithium ion conductivity to liquid or polymeric electrolytes is LiTFSI and LiFSI. In some embodiments, the lithium salts also have a melting/decomposition temperature higher than that of sulfur. In some embodiments, the sacrificial template comprises a sodium salt.

In some embodiments, the electrode also includes an electronically conductive solid. In some embodiments, the electronically conductive solid can comprise carbon, graphite, fullerenes, carbon nanotubes, graphene, graphene oxide or the like. In some embodiments, an electronic conductor in contact with the sulfur increases its charge transfer rate and its electrochemical reactivity. In some embodiments, the electronically conductive solid forms a continuous percolating network within said electrode. In some embodiments, the electronically conductive solid forms a chemical bond with said sulfur. In some embodiments, the bonding between the sulfur and the electronic conductor produces triple-phase junctions where the conductor, the sulfur, and the electrolyte meet. In some embodiments, the electrochemical reactivity is increased at such triple-phase junctions (also referred to as triple junctions). In some embodiments, the sacrificial template is used in the form of a particulate material. In some embodiments, the sacrificial template material restricts spreading of sulfur on the surface of said conductive solid. In some embodiments, the sacrificial template material preferentially segregates to the interface or intersection of the sulfur and said conductive solid, and thereby limits coarsening of the sulfur or spreading of the sulfur on the conductive solid. In some embodiments, the sacrificial template material is wetted or partially wetted by the sulfur, causing the sulfur to adopt the morphology, topology, or surface structure of the sacrificial template. In some embodiments, the sacrificial template has a specific surface area between 0.1 and 1000 $m^2/g$, more preferably between 0.2 and 500 $m^2/g$, and more particularly still between 0.3 and 100 $m^2/g$. In some embodiments, the sacrificial template after removal produces sulfur with a specific surface area between 0.1 and 1000 $m^2/g$, more particularly between 0.2 and 500 $m^2/g$, and more particularly still between 0.3 and 100 $m^2/g$.

In some embodiments, the sacrificial template material combined with sulfur and the conductive solid produces a composite electrode which when infiltrated by the electrolyte has a higher total length of sulfur-electrolyte-conductive solid junctions, namely triple-phase junctions, than the same composite electrode in the absence of the sacrificial template. In some embodiments, the sacrificial template is has a morphology, topology, or surface structure controlled by the prior processing of the sacrificial template, including but not limited to: classification of particulates of the sacrificial template by particle size or particle size distribution, and selection of a preferred particle size or particle size distribution; Sintering of particulates of the sacrificial template material; controlling the particle and/or pore geometry of the sacrificial template material; fabricating the sacrificial template material in the form of anisometric particles or consolidating said material with anisometric pores; fabricating said sacrificial template material or resulting sulfur-comprising electrode so as to have aligned or low-tortuosity porosity, including having alignment or low tortuosity porosity in the primary direction of ion transport in the battery electrode, e.g., normal to the plane of a planar electrode or the separator of the electrochemical cell; forming said sacrificial template material as anisometric particles through precipitation processes; and forming aligned microstructures or aligned porosity or low tortuosity porosity using directional extrusion or solidification methods.

In some embodiments, the sacrificial template has a morphology, topology, or surface structure with periodic or quasi-periodic features prepared by any of the above methods. In some embodiments, a preparation process includes heating a combination of the conductive solid, sacrificial template material, and sulfur to a temperature above the melting point of sulfur and below the melting or decomposition temperature of the sacrificial template material, and subsequently dissolving said sacrificial template material with a solvent phase. Other embodiments include the preparation process combined with using a solvent phase to which the dissolved sacrificial template is added to produce a liquid electrolyte subsequently used in the battery. In some embodiments, the solvent phase contains solvents, salts used to provide working ion conductivity or electrolyte additives, such as those used to control solid-electrolyte interphase (SEI) formation, control gassing, or provide benefits well known to those skilled in the art. In some embodiments, the process includes using a solvent phase that is subsequently removed from the electrode and replaced by an electrolyte.

The invention claimed is:

1. A method for preparing a sulfur electrode comprising:
   (a) combining sulfur powder, at least one lithium salt, and an electrically conductive solid;
   (b) heating the combination of step (a) at a temperature sufficient to melt the sulfur powder but not the lithium salt, thereby causing at least a portion of the sulfur to redistribute in the electrically conductive solid forming a composite;

(c) cooling the composite to solidify the sulfur; and
(d) extracting at least a portion of the lithium salt from the composite with a solvent.

2. The method of claim 1, wherein the at least one lithium salt is selected from the group consisting of LiTFSI and LiFSI.

3. The method of claim 1, wherein the at least one lithium salt is selected from the group consisting of $LiClO_4$, $LiPF_6$, $LiBF_4$, LiBETI, and LiBOB.

4. The method of claim 1, wherein the electrically conductive solid is selected from the group consisting of carbon, nanoporous carbon, mesoporous carbon, graphite, fullerenes, carbon nanotubes, graphene, and graphene oxide.

5. The method of claim 1, wherein the solvent is selected from the group consisting of ethylene carbonate, propylene carbonate, butylene carbonate, and their chlorinated or fluorinated derivatives, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate, γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, and glymes, including mono-glyme, di-glyme, tri-glyme and tetra-glyme.

6. The method of claim 1, wherein said heating of step (b) ranges from about 115° C. to about 165° C.

7. The method of claim 6, wherein said heating of step (b) is 160° C.

8. The method of claim 7, wherein said heating of step (b) continues for about 5 minutes.

9. A sulfur electrode prepared by the method of any one of claims 1-8.

10. The sulfur electrode of claim 9, wherein the at least one lithium salt is selected from the group consisting of LiTFSI and LiFSI.

11. The sulfur electrode of claim 9, wherein the at least one lithium salt is selected from the group consisting of LiC104, LiPF6, LiBF4, LiBETI, and LiBOB.

12. The sulfur electrode of claim 9, wherein the electrically conductive solid is selected from the group consisting of carbon, nanoporous carbon, mesoporous carbon, graphite, fullerenes, carbon nanotubes, graphene, and graphene oxide.

13. The sulfur electrode of claim 9, wherein the lithium salt and sulfur are present in particulate form, and the particles of sulfur have a particle size ranging from about 5 nm to about 500 μm.

14. The sulfur electrode of claim 9, wherein the sulfur has a specific surface area ranging from about 0.3 m2/g to about 100 m2/g.

15. An electrochemical cell comprising the sulfur electrode of claim 9.

16. A battery comprising the electrochemical cell of claim 15.

17. A sulfur electrode mixture, comprising an electrically conductive solid and at least one lithium salt and sulfur, substantially free of electrolyte, wherein the lithium salt and sulfur are present in particulate form, and the particles of sulfur have a particle size ranging from about 5 nm to about 500 μm.

18. A sulfur electrode, comprising an electrically conductive solid and particulate sulfur dispersed in particulate form within the electrically conductive solid, wherein the sulfur has a specific surface area ranging from about 0.3 $m^2$/g to about 100 $m^2$/g.

19. An electrochemical cell comprising the sulfur electrode of claim 18.

20. A battery comprising the electrochemical cell of claim 19.

* * * * *